UNITED STATES PATENT OFFICE.

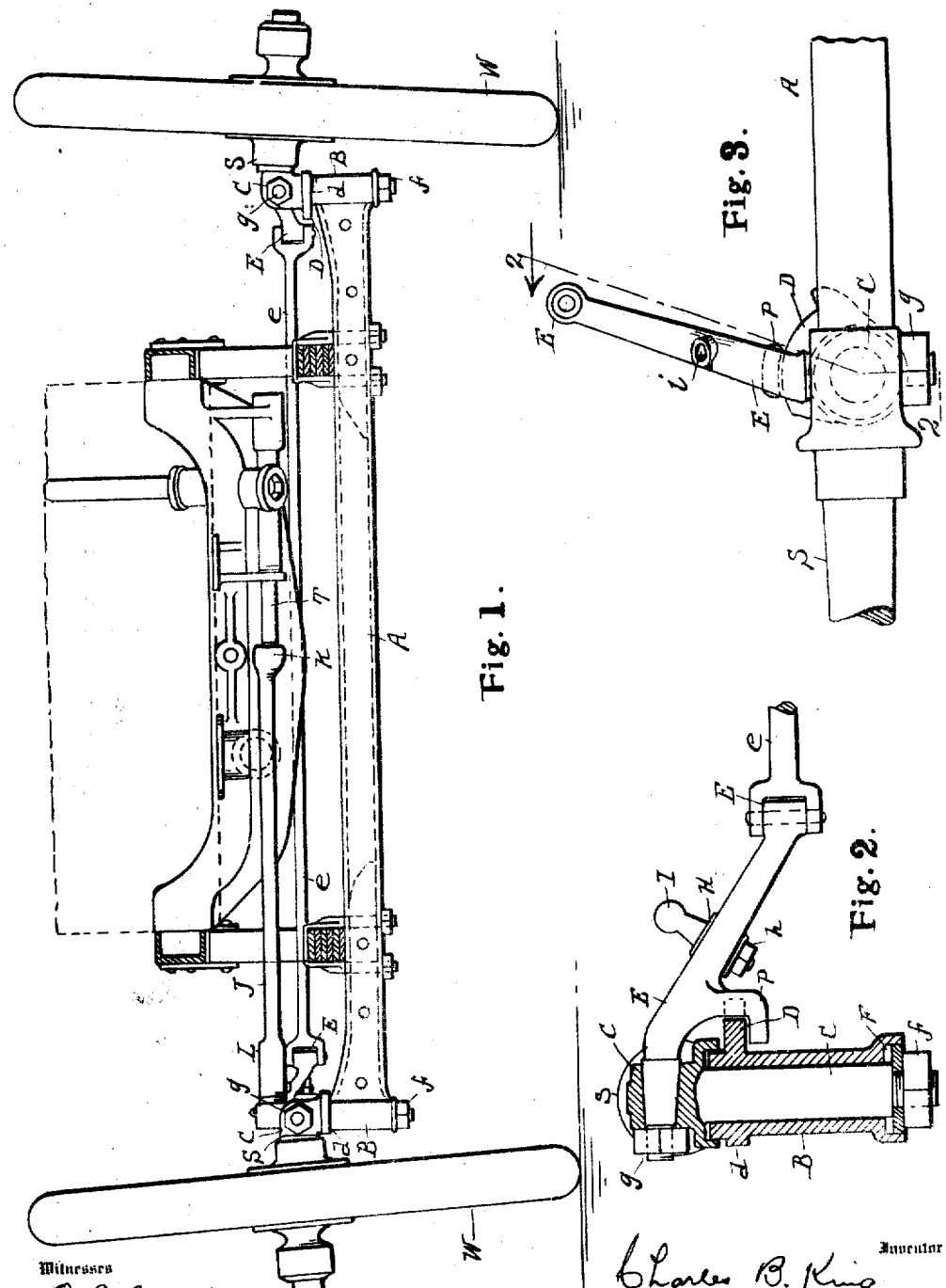

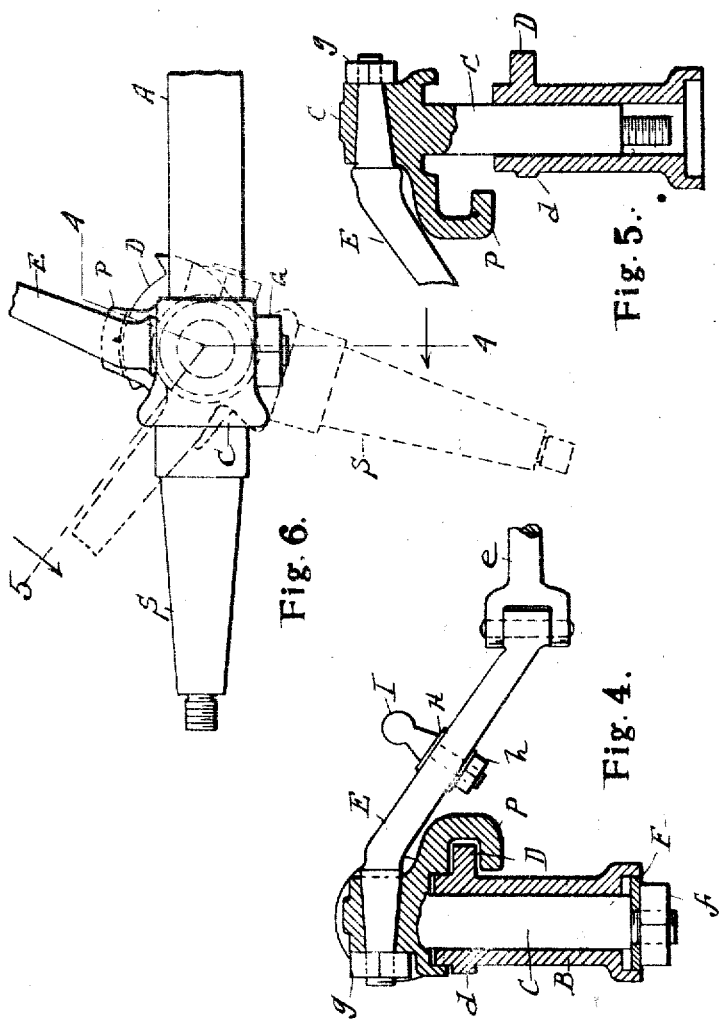

CHARLES B. KING, OF DETROIT, MICHIGAN, ASSIGNOR OF ONE-HALF TO ORA J. MULFORD, OF DETROIT, MICHIGAN.

STEERING-GEAR FOR AUTOMOBILES.

1,012,562.   Specification of Letters Patent.   Patented Dec. 19, 1911.

Application filed July 21, 1910. Serial No. 572,956.

*To all whom it may concern:*

Be it known that I, CHARLES B. KING, a citizen of the United States, residing at Detroit, county of Wayne, State of Michigan, have invented a certain new and useful Improvement in Steering-Gear for Automobiles, and declare the following to be a full, clear, and exact description of the same, such as will enable others skilled in the art to which it pertains to make and use the same, reference being had to the accompanying drawings, which form a part of this specification.

My invention relates to steering gear for automobiles, and consists in the improvements hereinafter described and pointed out in the claims.

Referring to the accompanying drawings, Figure 1, is a front elevation of a steering gear embodying my invention, and so much of an automobile as is necessary to illustrate its connection therewith. Fig. 2, is a detail sectional view, the section being taken on the line 2—2 of Fig. 3. Fig. 3, is a detail plan view of the parts shown in Fig. 2, the parts, sectioned in Fig. 2 being shown in full in this figure. Fig. 4, is a detail view of a modified construction of the parts shown in Fig. 2, the section being taken on the line 4—4, Fig. 6. Fig. 5, is a view similar to Fig. 4, the section being taken on the line 5—5, Fig. 6, and the parts being shown in different relative positions, to illustrate the mode of separating and assembling the parts. Fig. 6, is a detail plan view of one of the stub axles and adjacent parts.

A, is the front axle of an automobile.

B, B, are vertical cylindrical bearings.

C, are the vertical arbors to which the stub shafts, upon which the wheels W W turn, are connected.

D, is a flange formed in a horizontal plane around each of the bearings B toward its upper end.

E, is an arm secured in a socket at the top of the arbor C, and secured therein by nuts g. The arms E, E, form the levers by which the stub shafts S are turned to different positions, their arbors C, C, turning in the bearings B, B.

F, is a washer at the lower end of each of the arbors C, C, and f is a nut upon the lower end of each of said arbors securing the washer F in position. Normally the weight of the vehicle carried by the front axle A, comes upon the washer F and upon the nuts f, f.

P, is a hanger extending downward from each of the lever arms E and bending under the flange D. The hanger P is re-curved at its lower end and extends inward toward the bearing B. The flange D is of unequal breadth at different points, it extending a considerable distance from the bearing at its part which is adjacent to the normal position of the hanger P that is for the normal steering angle, and the re-curved part of said hanger extending under said broad portions of the flange D. At the narrower portion d of the flange D, it is so close to the bearing that the arbor C may be raised from said bearing, the re-curved portion of the hanger P passing by the narrow part d of the flange, as indicated in Fig. 5, or the flange D may extend only partly around the bearing.

Should a nut f become loose, the weight of the vehicle upon the forward axle will then be sustained by the flange D and the re-curved portion of the hanger P in the normal operation of the car and in the assembled position of the parts.

In the form shown in Figs. 4 and 5 the hanger P is integral with the arbor C and stub axle S, instead of being formed upon the arm E as in the form shown in Fig. 1.

i, (Fig. 3) is a socket formed in one of the lever arms E.

H, is a pin secured by a nut h in the socket i. The pin H is formed into an approximately spherical shape at its upper end, as indicated at I.

J, is a tubular rod having an enlarged portion K at one end and an enlarged cylindrical portion L at the other end.

T, is a rod adapted to be actuated by the turning of the steering post of the vehicle in any convenient way.

t, is a spherical end formed on the rod T. The spherical end t of the rod T fits into the enlargement K on one end of the tubular rod J and the end of said rod is then pressed together so as to form the socket inclosing the ball t. The spherical end I of the pin H extends into the cylindrical enlargement L of the tubular rod J.

M and N are blocks adapted to slide longitudinally in the enlargement L and to fit against the spherical end I of the rod H, as indicated.

m and n are coil springs in the enlargement L.

a is a cap provided with ears at b.

The outer end of the enlargement L is provided with screw threads on its outer surface and the cap a is provided with screw threads which engage the screw threads of the enlargement L.

R, is a rod bearing at one end against a washer r in the enlargement L and at the other end against the spherical end t of the rod T. The spring n acts by its resilience to press against the block N and against the washer r, thus forcing the rod R against the spherical end t of the rod T and taking up any lost motion that might have otherwise existed in the ball and socket joint Kt. The spring m presses by its resilience against the cap a and against the block M so as to press the latter against the spherical end I of the pin H.

By this construction a resilient connection is formed in which all lost motion is taken up between the rod and the lever arm E.

What I claim is:—

1. In an automobile, the combination of an axle, an approximately vertical bearing thereon, an arbor in said bearing, a stub-axle extending laterally from said arbor above said bearing, a laterally extending lug on said bearing, and a lug extending from said arbor above said bearing over and under the lug on said bearing.

2. In an automobile, the combination of an axle, an approximately vertical bearing thereon, an arbor in said bearing, a stub axle extending laterally from said arbor above said bearing, said bearing being provided with a flange extending laterally therefrom, and horizontally partly around the same, said stub axle being provided with a lug extending under said flange, said lug and flange being so formed that the lug may pass by said flange when turned to a certain angular position.

3. The combination of an approximately vertical bearing, an arbor in said bearing, a nut upon the lower end of said arbor and normally engaging said bearing, said bearing being provided with a flange extending laterally outward therefrom, and a part extending out from said arbor over said flange and passing under said flange but normally out of contact therewith, substantially as and for the purpose described.

4. The combination of an approximately vertical bearing, an arbor in said bearing, a nut upon the lower end of said arbor and normally engaging said bearing, said bearing being provided with a flange extending laterally outward therefrom and laterally therearound and a part extending from said arbor over said flange and passing under said flange but normally out of contact therewith said flange and lug being so formed that they may pass by each other when turned to a certain angular position.

5. In an automobile, the combination of an axle A, an approximately vertical bearing B thereon, an arbor C in said bearing, a stub-axle S extending from said arbor above said bearing and carrying one of the wheels thereon, a lug extending from said bearing, a lug extending from said arbor above said bearing, said lugs being adapted to engage each other to prevent a separation of said bearing and arbor in a longitudinal direction, said lugs being of limited extent in an angular direction so that they are adapted to engage at one relative angular position of said bearing and arbor and to pass by each other at another angular position of said bearing.

In testimony whereof, I sign this specification in the presence of two witnesses.

CHARLES B. KING.

Witnesses:
LOTTA LEE BRAY,
ELLIOTT J. STODDARD.